(No Model.)
H. H. CALL & A. A. CLOUGH.
COTTON PICKER.
No. 492,378. Patented Feb. 21, 1893.
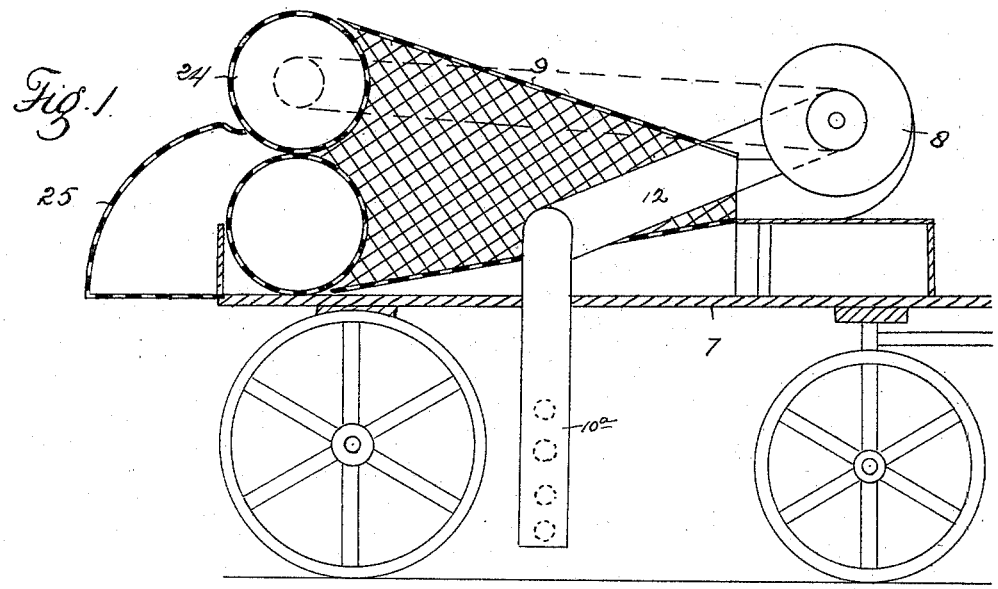
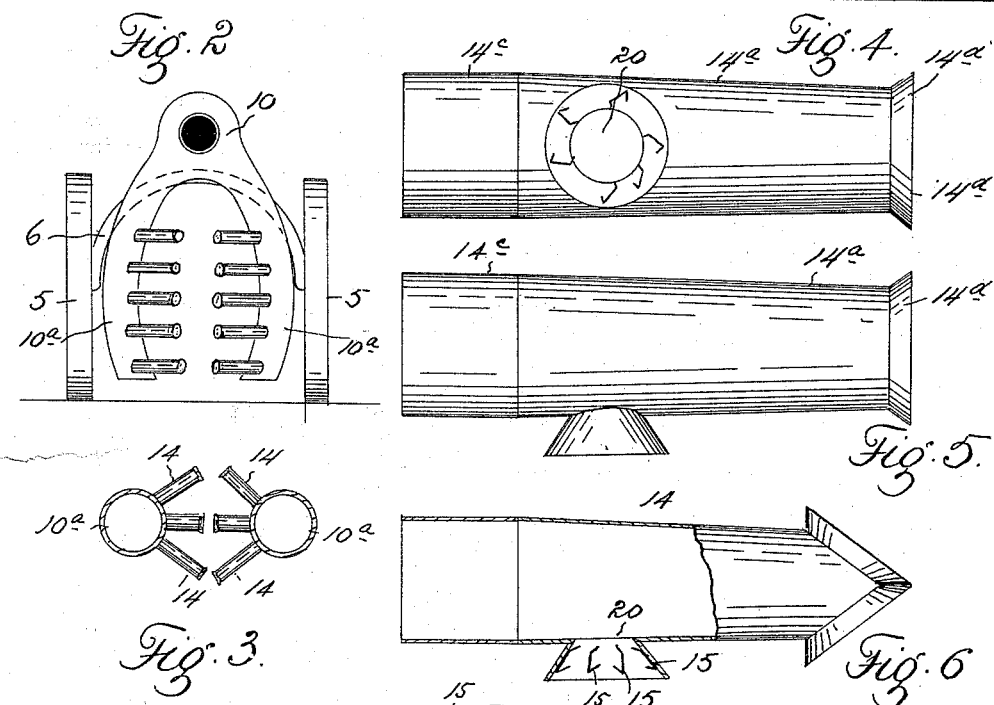

UNITED STATES PATENT OFFICE.

HARRY H. CALL AND AUGUSTUS A. CLOUGH, OF DENVER, COLORADO.

COTTON-PICKER.

SPECIFICATION forming part of Letters Patent No. 492,378, dated February 21, 1893.

Application filed July 25, 1892. Serial No. 441,214. (No model.)

*To all whom it may concern:*

Be it known that we, HARRY H. CALL and AUGUSTUS A. CLOUGH, citizens of the United States of America, residing at Denver, in the county of Arapahoe and State of Colorado, have invented certain new and useful Improvements in Cotton-Pickers; and we do declare the following to be a full, clear, and exact description of the invention, such as will enable others skilled in the art to which it appertains to make and use the same, reference being had to the accompanying drawings, and to the figures of reference marked thereon, which form a part of this specification.

Our invention relates to improvements in cotton pickers and the object of the invention is to provide a machine which shall automatically remove the cotton from the plant as it passes along, through the instrumentality of suction. To accomplish this purpose we provide a furcated dependent tube or conduit adapted to straddle the plants with the limbs of the fork extending down on either side of the row of plants and provided with laterally projecting nozzles having diverging or funnel shaped mouths, said nozzles being arranged to project into the line of plants. These nozzles are sufficient in number and so located as to remove all the staples from a row of plants which the machine straddles during use.

The invention will be fully understood by reference to the accompanying drawings in which is illustrated an embodiment thereof.

In the drawings, Figure 1 is a side elevation of the vehicle carrying the suction mechanism and picker nozzles. Fig. 2 is an end view with the suction mechanism removed. Fig. 3 is a horizontal transverse section taken through the suction tube. Figs. 4, 5, 6 and 7 illustrate the nozzles in detail and on an enlarged scale.

Similar reference characters indicating corresponding parts or elements of the mechanism in the several views let the numeral 5 designate the wheels of the vehicle journaled on the bow-shaped axles 6 upon which is secured the platform or body 7 supporting the suction mechanism 8 which is connected with the receiving chamber 9 and with the tube 10 through the medium of a pipe 12. The arms $10^a$ of the tube embrace the plants, being high enough to reach to the tops and reaching low enough to cover the entire staple bearing portion of the plants. The arms are provided with the nozzles 14 composed of the rigid body portion $14^a$, flexible base $14^c$ and the funnel shaped mouth $14^d$ carrying inwardly projecting claws 15 which permit the cotton to enter the nozzle mouth without obstruction, but are so shaped that they will retain the staples and pull them from the boll as the machine passes along, even though the suction should be insufficient to remove the cotton from the plant. Hence these claws acting in conjunction with the suction induced in the pipe embracing the plants, insure the removal of all the staples therefrom. The body of the nozzles may be provided with one or more side openings 20 surrounded by funnel shaped mouths $14^d$ provided with claws 15 as before explained. The last named openings afford another avenue through which the cotton is drawn into the suction pipe. The extremity of each nozzle may be provided with a double funnel-shaped opening as shown in Fig. 6. This construction is believed to increase the picking capacity of the nozzle.

In the use of the machine it is moved across the field in such a position that the arms of the depending tube pass on either side of the row of plants. The required suction is induced in the pipes by appropriate mechanism carried by the vehicle and actuated by any suitable power. The cotton is drawn by the suction through the nozzles 14, hollow arms $10^a$, pipe 12 and mechanism 8 and discharged into the receiving chamber 9 and thence through rollers 24 into chamber 25, the suction mechanism, rollers and receiving chamber being substantially the same as shown in our previous application for patent, Serial No. 415,540, filed December 18, 1891.

Having thus described our invention, what we claim is—

1. In a cotton harvester, such as described, the combination with a vehicle and suction inducing mechanism mounted thereon, a depending tube or conduit provided with laterally projecting arms adapted to penetrate the bush, said arms being provided with mouths or induction passages for the reception of the staple; substantially as described.

2. The combination with a suitable vehicle and suction inducing mechanism supported thereon, of a depending forked tube, the limbs of which embrace the plant on either side, each depending arm being provided with a series of laterally projecting arms having mouths to receive the staples; substantially as described.

3. The combination with a suitable vehicle carrying suction inducing mechanism, of a depending forked tube connected with said mechanism, the limbs of the tube embracing the plants on either side, each depending limb being provided with a series of lateral arms projecting into the bush or plant, said lateral arms being provided with mouths to receive the staples, and retaining claws located upon the interior diverging walls of said mouths; substantially as described.

In testimony whereof we affix our signatures in presence of two witnesses.

HARRY H. CALL.
AUGUSTUS A. CLOUGH.

Witnesses:
WM. MCCONNELL,
W. R. WILCOX.